UNITED STATES PATENT OFFICE.

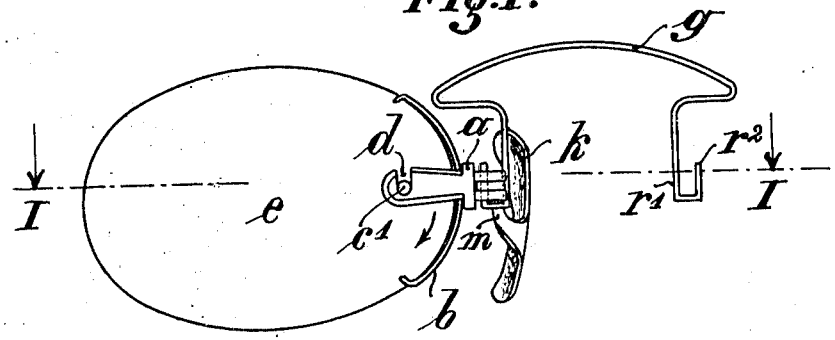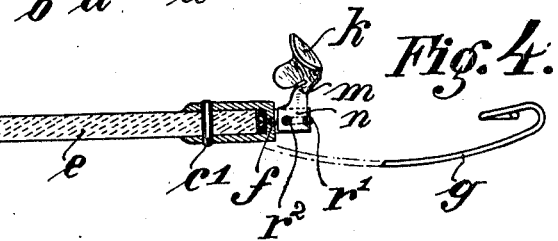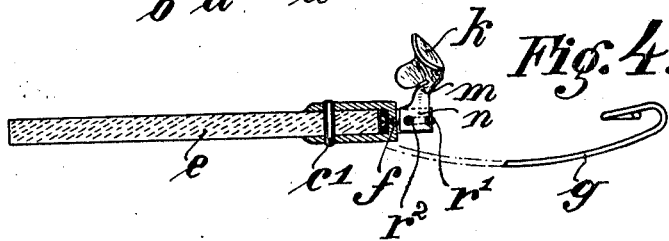

BRUNO MOLDENHAUER, OF BERLIN, GERMANY.

DETACHABLE LENS-MOUNT FOR EYEGLASSES.

1,107,823.

Specification of Letters Patent. Patented Aug. 18, 1914.

Application filed August 20, 1913. Serial No. 785,612.

*To all whom it may concern:*

Be it known that I, BRUNO MOLDENHAUER, a subject of the King of Prussia, German Emperor, and resident of Berlin, in the Kingdom of Prussia, German Empire, have invented a new and Improved Detachable Lens-Mount for Eyeglasses, of which the following is a specification.

This invention relates to a detachable lens mount or pince-nez which excels the known constructions by the fact that it may easily be taken to pieces without necessitating for this purpose any disconnection of a screw connection and without the application of a tool. The advantage obtained by constructing the pince-nez in this manner resides in enabling the wearer to exchange any part of the pince-nez himself in the case of a break or damage, no expert being required to do the work.

In order to make my invention more clear, I refer to the accompanying drawing, in which similar letters denote similar parts throughout the several views, and in which:

Figure 1 shows one half of my improved pince-nez. Fig. 2 shows the same parts taken to pieces. Fig. 3 is a plan of the glass holder $a\,b$ with a few neighboring parts. Fig. 4 is a horizontal section in line I—I of Fig. 1.

Each of the glasses $e$ is held by a U-shaped lens mount $a$, the legs of which form hooks $d\,d$ which receive a pin $c^1$ passed through a hole $c$ of the glass $e$ and projecting appropriately far over the front and the rear surface of the glass. The lens mount $a$ has between its legs a curved spring $b$ affixed to the lens mount by means of a small screw $f$; the ends of the spring are preferably forked (Fig. 3). When shoving the glass into the lens mount $a$ and putting the spring $b$ under tension and placing the pin $c$ into the hooks $d\,d$, the spring firmly embracing a corresponding part of the rim of the glass keeps the pin and the hooks securely together, and thus also the glass and the lens mount, preventing at the same time any unintentional disengagement of the parts in question.

Supposed. a glass is to be exchanged, the respective glass is held between two fingers and the respective lens mount is removed from it by being drawn away in the direction of the arrows (Fig. 1,) disconnecting thus the hooks $d\,d$ and the pin $c$. The pin is put through another glass and placed again into the hooks, the glass putting at the same time the spring again under the tension by which the parts concerned are held together, as before described.

Connecting the two lens mounts with each other is effected by a bow made of elastic wire and having its ends formed into two U's having each a long leg or body leg $r^1$ and a short leg or free leg $r^2$. The legs coöperate with the two lugs $d^1$ of the lens mount $a$, that is to say, with the holes $h$ and the recesses $i$ of said lugs. These latter are placed with their recesses $i$ against the long leg of the bow, above the short leg, and are shoved down along said long leg so as to make the short leg enter the holes $h$, when the lens mount will not only be coupled to the U, but will also be prevented from turning at the same. Disconnecting these parts can be effected obviously by merely shoving the lens mount upward at the U, until it leaves the leg $r^2$, when it can be removed from the leg $r^1$ also.

The slot $l$ between the two lugs $d^1$ serves for receiving a small supporting plate $n$ which forms part of the nose grip $k$ and is connected with the body portion of the same by an elastic intermediate piece $m$. The plate $n$ has a bore $o$ and a recess $p$, and the relative position of the bore and the recess corresponds to the relative position of the holes $h$ and the recesses $i$ of the lugs $d^1$. The plate $n$ is inserted into the slot $l$ before the lugs $d^1$ are coupled with the legs of the U of the bow $g$. When such coupling is effected, not only the lens mount, but the nose grip, too, is firmly connected with the bow, and with the lens mount also, and all parts are consequently perfectly securely connected with each other, and may, if necessary, be separated from each other without unscrewing any screw, there being no such a one at all, and without any tool whatever, as before stated.

Having now described my invention, what I desire to secure by a patent of the United States is:

1. In a pince-nez, the combination of a lens having a fastening hole therethrough, a lens mount provided with legs adapted to straddle said lens, each of said legs terminating in a hook portion, a pin adapted to be passed through said hole and be engaged by said hook portions, and a curved spring attached to said lens mount and adapted to be placed under tension by the lens rim to maintain said pin and hook portions in assembled condition.

2. In a pince-nez, the combination of a pair of lenses each having a fastening hole therethrough, a lens mount for each lens provided with legs adapted to straddle the lens, each of said legs terminating in a hook portion, a pin for each lens hole adapted to be engaged by the respective hook portions, a curved spring attached to each lens mount and adapted to be placed under tension by the lens rim to maintain said pins and hook portions in assembled condition, a nose grip attached to each lens mount and a bow connecting said nose grips.

3. In a pince-nez, the combination of a pair of lenses each having a fastening hole therethrough, a detachable lens mount for each lens provided with legs adapted to straddle the lens, each of said legs terminating in a hook portion, a detachable pin for each lens hole adapted to be engaged by the respective hook portions, a curved spring attached to each lens mount and adapted to be placed under tension by the lens rim to maintain said pins and hook portions in assembled condition, a detachable nose grip attached to each lens mount, and a detachable bow connecting said nose grips.

4. In a pince-nez, the combination of a pair of lenses, each having a fastening hole therethrough, a detachable lens mount for each lens provided with legs, each of said legs terminating in a hook portion, a pin for each lens hole to connect said lens with said lens mount through said hook portions, a lug on each lens mount, an elastic bow having U-shaped ends adapted to be coupled with said lugs and detachable nose-grips also adapted to be coupled with said lens mounts as well as with said bow.

5. In a pince-nez, the combination, with an elastic bow having U-shaped legs, of detachable lens mounts having bores adapted to receive one leg of the respective U, and recesses adapted to receive the other leg of the same; and detachable nose grips having corresponding bores and recesses and adapted to be secured in place by them together with said lens mounts, substantially as described.

6. In a pince-nez, the combination with an elastic bow having U-shaped legs, of detachable lens mounts having each a pair of legs adapted to receive a glass between them and a pair of lugs situated at right angles to said other pair and adapted to receive a nose grip between them; a fastening hole in each glass; a pin adapted to be passed through said hole; upwardly open recesses provided in said legs and adapted to receive said pin; a flat curved spring attached to each of said lens mounts and adapted to press upon the glass rim; a plate forming part of the nose grip and adapted to take between said lugs; an elastic bow having U-shaped ends forming each a short leg and a long one; bores provided in the said lugs and in said plate and adapted to receive said short legs, and recesses provided in the same parts and adapted to receive said long legs, for the purpose as described.

BRUNO MOLDENHAUER.

Witnesses:
HENRY HASPER,
ARTHUR SCHROEDER.